Figure 1:
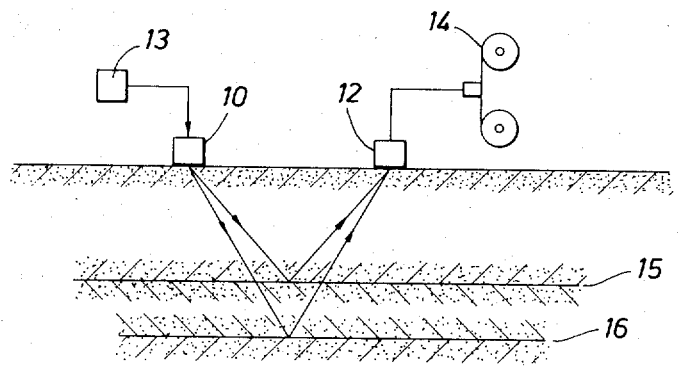

United States Patent
Taner

[15] 3,697,938
[45] Oct. 10, 1972

[54] SEISMIC PROSPECTING WITH RANDOM INJECTED SIGNAL

[72] Inventor: Mehmet Turhan Taner, Houston, Tex.

[73] Assignee: Seismic Computing Corp., Houston, Tex.

[22] Filed: Nov. 7, 1969

[21] Appl. No.: 874,867

[52] U.S. Cl.........340/15.5 TA, 340/15.5 CC, 340/15.5 TC
[51] Int. Cl. ................................................G01v 1/22
[58] Field of Search............340/15.5 CD, 15.5 TA, 15.5 TC, 15.5 CC; 343/18 E, 100 CC

[56] References Cited

UNITED STATES PATENTS

| 3,483,514 | 12/1969 | Barbier et al............. 340/15.5 |
| 3,365,697 | 1/1968 | Fail et al....................340/15.5 |
| 3,185,958 | 5/1965 | Masterson................340/15.5 |
| 2,671,896 | 3/1954 | De Rosa.....................343/18 |
| 2,768,372 | 10/1956 | Green.........................343/100 |

Primary Examiner—Benjamin A. Borchelt
Assistant Examiner—N. Moskowitz
Attorney—Pravel, Wilson & Matthews

[57] ABSTRACT

A method of seismic prospecting using an injected seismic signal which includes a series of impulses spaced in time from one another by time intervals of a random nature. The time spacing is substantially non-repetitive and exhibits no ascending, descending or harmonic patterns.

9 Claims, 7 Drawing Figures

M. T. Taner
INVENTOR

BY Arnold, Roylance,
Kruger & Durkee
ATTORNEYS

SEISMIC PROSPECTING WITH RANDOM INJECTED SIGNAL

Reflection seismography as used for oil and gas prospecting, has made use of vibratory type signal sources because of the greater efficiency of coupling and ease of generation of signals, as compared to explosive charges. The vibratory signals are continuous over periods of time exceeding the travel time of reflected impulses; in order to obtain time or distance information it is necessary to vary the frequency or otherwise code the injected signal. For example, the so-called "Vibroseis" method set forth in U.S. Pat. Nos. 2,688,124 and 2,989,726 uses a signal which sweeps from 20 to 80 cps in 4 seconds then back in an equal period. This technique has found wide utility, but yet lacks some of the advantages of pulse or shot type prospecting. Cross-correlation is necessary, and even so results in poor resolution of weak reflecting strata when near strongly reflecting interfaces. For this reason, binary coded sinusoidal signals as set forth in U.S. Pat. No. 3,221,298 have been used in place of variable frequency sources. However, the frequency content of these signals in rather shallow, and regular spacing enhances certain unwanted noise and reverberations.

Therefore, a primary feature of this invention is the provision of an injected seismic signal which will establish no patterns which may coincide with noise, harmonic relationships, and the like, whereby a continuous seismic signal may be more readily interpreted with more meaningful results. Another feature is to provide a seismic signal source which contains signal pulses of wide frequency band, which at the same time acquires the advantages of continuous injected signals along with compositing or stacking techniques.

In accordance with this invention, an injected signal is used in a reflection seismographic method, which signal includes a sequence of elastic impulses generated by a vibrator or the like as individual pulses rather than a continuous waveform. The time spacing between pulses is substantially random and non-repetitive, at least within the average travel time for the reflected seismic signals. A large number of impulses are transmitted, over a time period exceeding the travel time, providing the advantages of multiple shots, but yet this may be accomplished in a very short time compared to the total of as many individual runs. Not only is time saved, but also the number of data recordings to be processed is reduced. More significantly, this technique results in a composite record which exhibits greatly enhanced signal-to-noise ratio, and minimizes the side lobes compared to the main lobe in correlation. The compositing technique used may be simple additive correlation, taking into account the same time intervals used in time spacing the injected signal. The degree of cross-correlation between channels using this technique may be expressed as $N(N-1)/2$, where N is the number of pulses in the sequence; a dramatic enhancement in the number of cross-correlations that will show an increase in the main peak return, compared to noise, is noted.

Figure 2:
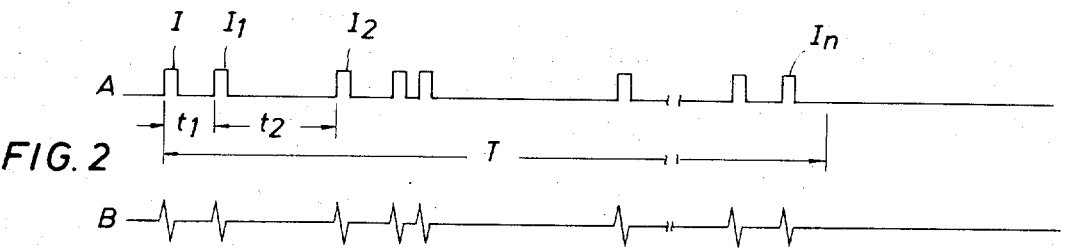
Figure 3A:
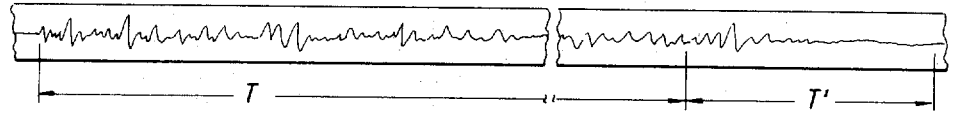
Figure 3B:
Figures 4A, 4B, 5:
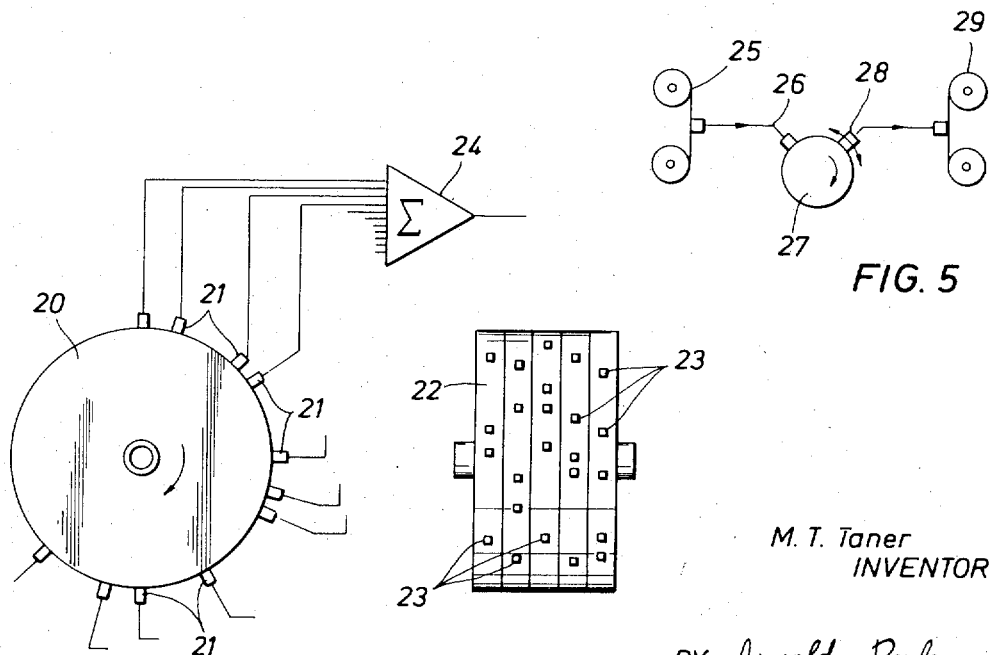

The novel features believed characteristic of the invention are set forth in the appended claims. The invention itself, however, as well as further objects and advantages thereof, may best be understood by reference to the following detailed description of an illustrative embodiment, when read in conjunction with the accompanying drawing, wherein:

FIG. 1 is an elevation view in schematic form of a seismic prospecting system which may use the signal source of the invention;

FIGS. 2 A and 2 B are graphic representations of series of impulses used for the injected seismic signal according to the invention;

FIG. 3 A is a graphic representation of a recording made in the system of FIG. 1 using the injected signal of the invention, and FIG. 3 B is a representation of the composited record;

FIGS. 4 A and 4 B are schematic representations of playback arrangements for magnetic recordings as may be used with the invention; and FIG. 5 is a schematic representation of another compositing arrangement providing the same function as that of FIGS. 4 A and 4 B.

The drawings form a part of this specification and are incorporated herein. It is noted that like parts appearing in several views of the drawings will bear like reference numerals.

With reference now to FIG. 1, a schematic representation of a seismic prospecting system is depicted, with the system including a seismic source 10 for injecting a signal of the type herein described into the surface of the earth 11, along with a seismometer or geophone 12 for detecting reflected seismic signals. The pattern of seismic impulses produced by the source 10 may be established or controlled by a pulse or signal generator 13 connected to the seismic source 10. Reflected signals reaching the seismometer 12 are converted into electrical impulses which are applied to a recorder 14 of conventional form. It is understood that in place of one seismometer 12, an array of geophones may be used according to conventional practice, the output of each geophone being separately recorded, or a composite made for a single recording. The seismic impulses will travel into the earth and be reflected from various subsurface strata 15 and 16 as indicated. The travel time for the impulses will differ depending upon the depth of the strata and the composition of the material through which the wave travels, so that following each impulse a series of reflected impulses will be received at the geophone 12 representing the various strata, reverberations, and of course noise.

Referring to FIG. 2 A, there is shown a representation of one type of seismic signal which is injected by the source 10, according to the invention this signal comprising a sequence of impulses I, $I_1$, $I_2$, etc.. Each of the impulses I would be of a length of perhaps 4 to 8 milliseconds, and of noticeably square shape, i.e., having a somewhat flat waveform for a significant period between the leading and trailing edges of the impulse. Thus, the impulse would have a period of constant pressure as distinguished from being a sharp spike rising rapidly in pressure and then dropping rapidly. A square wave of this type produces a wide band of frequencies, including lower frequencies, while still having a predominant high frequency content which provides better resolution of closely spaced laminated strata. In number, the injected pulse train of FIG. 2 A may include perhaps 64 pulses spread over a total time period T of 8 seconds. This time period T is considerably in excess of the maximum travel time for significant reflected signals detected by the geophone, this maximum travel time being ordinarily considered to be less than about 4 seconds.

An important feature of the invention is the nature of the time spacing $t_1$, $t_2$, etc., between the impulses I in FIG. 2 A. These time periods $t$ are non-repeating and define no perceptible ascending or descending pattern. The time spacing may be characterized as pseudorandom, in that the spacing is random within certain limits or qualifications. First, the spacing does not repeat to any significant extent, at least within the average maximum travel time to and return from the deepest strata detected; thus, a given spacing may be duplicated near the beginning and again near the end of the 8 second period T. Secondly, the minimum spacing will be about 10 milliseconds to provide separation of reflected signals, while the maximum spacing will be dictated by the number of impulses I to be provided within a given time period T. Also, small integer multiples are to be avoided in the spacing periods $t$, e.g., 20:40 ms, because of the harmonic relationships; this would produce effects similar to repeating the impulse spacing. So, in this example, under the limitations that the spacing $t$ is at least about 10 ms, but less than about 200 or 250 ms, and $t$ is not repeated within a 3 or 4 second interval nor is a small integer multiple repeated in such interval, the spacing may be considered random.

Instead of the square waveform of the injected signal as seen in FIG. 2 A, a series of sharp pulses or a spike waveform may be employed as seen in FIG. 2 B, the difference being in the content of low frequencies. The wave shape of FIG. 2 B may be more convenient to produce with some types of vibrators presently available.

The injected seismic signal of FIG. 2 according to the invention may be generated by any one of several different techniques, employing conventional equipment. For example, an array of small explosive charges may be planted, slightly spaced from one another so that one does not set off adjacent ones, and these would be detonated by electrical signals in the desired time sequence. The source of electrical signals for this purpose may be simply a magnetic tape recording having recorded thereon appropriately spaced impulses. Alternatively, an electrohydraulic vibrator of any one of various types which are commercially available and described in the literature, may be employed, it being understood that impulse type signals would be used to drive the vibrator rather than a sinusoidal type of signal. A sharp impulse signal is produced by a vibrator if the unit is permitted to bounce rather than being held firmly in contact with the earth. Electrodynamic vibrators may also be used. If the minimum cycle time for impulsing one of these vibrators is greater than needed for signals as indicated in FIG. 2 A and 2 B, then several vibrators may be used so that they may be pulsed sequentially.

It is understood that the method of the invention may be used for offshore exploration, as well as for exploration on dry land. In this event, air guns may be used as commercially available from Bolt Associates, Inc. of Norwalk, Connecticut. Also, an impulser may be used which is of the type employing a chamber which is filed with explosive gas then ignited, as is well known in this art. The repeat time for a device of this type is rather long, so a large number would be used to generate the signal of FIG. 2.

Referring now to FIG. 3 A, a schematic representation of a recording as made by the recorder 14 in the system of the invention, is illustrated. Although shown as if a visual recording on a strip chart is used, it is understood that a magnetic recording would be employed most commonly, and indeed the recording may well be in digital rather than analog form. However, the same principles will apply, as if a visible analog recording were used. It is noted that the recorded reflected signals from one injected impulse I will overlap and be indistinguishable from those for adjacent impulses, since the spacing between impulses is much less than the average travel time. Thus, a direct observation of the recording is meaningless. The length of one recording will be the period T, plus an additional period T' to account for the maximum travel time for reflections associated with impulses I near the end of the period T. The recorded signals in FIG. 3 A are combined and processed as will be described to produce one composite representation as seen in FIG. 3 B, where each of the subsurface strata will be indicated by a clear reflected impulse.

The technique used to derive the representation of FIG. 3 B from the recording of FIG. 3 A may be simple additive correlation, taking into account the time spacing between the impulses I in the injected signal. One scheme for accomplishing this is illustrated in FIG. 4 A, where a magnetic recording device 20 of the drum type is illustrated. The magnetic tape recording 14, as represented by FIG. 3 A, would be reproduced on the recording surface of the drum 20, so that one revolution of the drum would equal the [T + T'] time period, or one completed "shot." A large number of pick-up heads 21 are spaced around the drum, with the spacing between the heads corresponding exactly to the time periods $t_1$, $t_2$, etc., between impulses I, $I_1$, $I_2$, etc. The same number of pickup heads 21 would be used as there were impulses I; for the example given above there would be 64 such heads. The mechanical difficulty of positioning a large number of pickup devices around a magnetic playback drum, in view of the necessary close spacing of some of the devices, may require an arrangement as seen in FIG. 4 B, wherein it is noted that a drum 22 is used which has several parallel channels each of which contains the same recorded information. There is considerable flexibility in this case, for positioning of read heads 23. In either event, whether the arrangement of FIG. 4 A or that of FIG. 4 B is used, the outputs of all of the pickup heads would be applied to a summing device 24, the output of which would be recorded as the representation of FIG. 3 B.

Referring to FIG. 5, another technique for compositing the information on the record of FIG. 3 A to produce that of FIG. 3 B is illustrated. The record produced from the recorder 14 is run through a playback device 25, and the output 26 therefrom is recorded on a magnetic drum 27 which is used as a variable delay device. The drum 27 has a pickup head 2 B which is variably positioned by mechanical means to produce any desired delay in the range of the period T. The output from the pickup 28 is recorded on another tape device 29. In operation, the tapes 25 and 29 would be run in synchronism through 64 successive traverses of the record, with the delay being changed each time to correspond to the periods $t_1$, $t_2$, etc. This technique may be implemented with more facility than that of FIG. 4, but requires much longer in elapsed time, to produce the final representation.

Although a time period T of 8 seconds, and a number of impulses I of 64 is given above as a convenient example, it is understood that these are merely illustrative, and other parameters would be used as fit the particular circumstances.

While the invention has been described with reference to specific embodiments, this description is not meant to be construed in a limiting sense. Various modifications of the disclosed embodiments, as well as other embodiments of the invention, may be apparent to persons skilled in the art upon reference to this description. It is therefore contemplated that the appended claims will cover any such modifications or embodiments as fall within the true scope of the invention.

What is claimed is:

1. A method of seismic prospecting comprising the steps of:
   injecting a seismic signal, including a plurality of impulses in pseudorandom time spacing from one another, into the earth;
   detecting a return signal including reflections of impulses in the injected seismic signal from subsurface strata in the earth; and
   correlating the detected signal according to the pseudorandom time spacing to produce a composite representation of the subsurface strata.

2. A method according to claim 1 wherein the seismic signal exceeds in time duration the maximum effective travel time for reflected impulses in the detected signal, and wherein a large number of such impulses are produced within an interval equal to such travel time.

3. A method according to claim 1 wherein the time spacing between impulses is characterized by the absence of small integral multiples of time spacing one to another.

4. A method according to claim 1 wherein the impulses are characterized by square waveshapes exhibiting a broad band of frequency content.

5. A method according to claim 1 wherein the detected impulses are recorded on a single recording and correlation thereof is by additive compositing in accordance with the individual time spacings between impulses in the pattern.

6. A method of determining travel time between spaced first and second points, comprising the steps of:
   transmitting a series of impulses from the first point to the second point, the impulses in the series being spaced from one another in time according to a pseudorandom time spacing;
   detecting the series of impulses; and
   compositing such impulses in accordance with the pseudorandom time spacing.

7. A method according to claim 6 wherein the impulses are reflected from at least one third point in travel between the first and second points, and the length in time duration of the series of impulses exceeds the effective maximum travel time.

8. A method according to claim 7 wherein the number of such impulses in the series and the spacing in time between impulses is such that the average time spacing is less than the average travel time.

9. A method according to claim 8 wherein the impulses are of a waveshape characterized by the absence of substantially sinusoidal portions, and by the inclusion of a broad band of frequency components.

* * * * *